United States Patent [19]

Masanobu

[11] Patent Number: 4,633,420
[45] Date of Patent: Dec. 30, 1986

[54] PROFILE MEASUREMENT APPARATUS USING RADIATION

[75] Inventor: Kazunori Masanobu, Tokyo, Japan

[73] Assignee: Tokyo Shibaura Denki Kabushiki Kaisha, Kawasaki, Japan

[21] Appl. No.: 786,357

[22] Filed: Oct. 11, 1985

Related U.S. Application Data

[63] Continuation of Ser. No. 442,646, Nov. 18, 1982, abandoned.

[30] Foreign Application Priority Data

Nov. 26, 1981 [JP] Japan .................. 56-189540

[51] Int. Cl.⁴ ............... G01N 23/16; G01N 23/22; G01B 15/02
[52] U.S. Cl. .................. 364/563; 250/359.1; 378/56; 364/469
[58] Field of Search ........... 364/469, 472, 551, 563, 364/571; 378/19, 56, 59; 250/358.1, 359.1, 360.1

[56] References Cited

U.S. PATENT DOCUMENTS

| | | | |
|---|---|---|---|
| 3,016,460 | 1/1962 | Andresen | 364/469 X |
| 3,910,124 | 10/1975 | Halsey | 73/601 |
| 3,955,086 | 5/1976 | Tsujii et al. | 378/56 |
| 4,009,376 | 2/1977 | Faraguet | 378/56 X |
| 4,037,104 | 7/1977 | Allport | 250/359.1 X |
| 4,047,036 | 9/1977 | Smith et al. | 250/359.1 X |
| 4,393,305 | 7/1983 | Shimizu et al. | 250/358.1 |

FOREIGN PATENT DOCUMENTS 890380 2/1962 United Kingdom .
1552224 9/1979 United Kingdom .

Primary Examiner—Felix D. Gruber
Attorney, Agent, or Firm—Oblon, Fisher, Spivak, McClelland, & Maier

[57] ABSTRACT

A profile measurement apparatus using radiation is disclosed which has three radiation sources and three arcuated multi-channel radiation detectors corresponding to the radiation sources. A rolled steel sheet or strip is conveyed between the radiation sources and the radiation detectors. The sector-shaped radiation beams respectively are radiated by the radiation sources to partially pass through the strip and to respectively incident on the corresponding radiation detectors, which produce profile signals corresponding to the intensities of the incident radiation beams. A microprocessor produces an image signal indicating the sectional shape of an irradiated linear area throughout the entire width of the strip in accordance with the profile signals and causes the display device to display the sectional shape. A mono-channel radiation detector is disposed near the multi-channel radiation detectors to constantly measure a partial thickness of the central portion of the strip.

10 Claims, 4 Drawing Figures

PROFILE MEASUREMENT APPARATUS USING RADIATION

This application is a continuation, of application Ser. No. 442,646, filed Nov. 18, 1982 now abandoned.

BACKGROUND OF THE INVENTION

The present invention relates to a profile measurement apparatus for measuring the thickness of a strip such as a rolled steel sheet by using radiation.

One of the most significant factors in the manufacture of a high-quality rolled steel sheet (strip) is controlling the thickness thereof to be uniform when the rolled steel sheet is continuously manufactured by a rolling mill or a reduction roll. For this reason, a high-speed measuring technique for continuously and accurately measuring the thickness of the produced strip is required to control the thickness of the strip to be uniform.

A conventional strip profile measurement apparatus (profile meter) using radiation comprises both a stationary profile detector for detecting a thickness at the central portion (of the width) of the rolled steel sheet moving linearly in one direction, and a movable profile detector for reciprocating along the width of the rolled steel sheet in a zigzag manner and for scanning its surface. Based on data obtained from the two types of detectors, the thickness of the rolled steel sheet over the entire area is approximated. When an undesirable variation in thickness of the rolled steel sheet is detected, the rolling operation of the reduction roll can be immediately adjusted on the basis of the detection data.

In the conventional profile meter of the type described above, since reciprocal movement of the movable profile detector in a zigzag manner allows it only to measure a partial region of the strip along a zigzag scanning line, most of the strip portion cannot be measured, often resulting in inaccurate measurement. Furthermore, since the profile detecting speed depends on a response time of the movable profile detector, it takes a relatively long period of time to complete measurement of the thickness of the rolled steel sheet along the entire width of the rolled steel sheet. As a result, thickness or profile measurement cannot be performed at a desired high speed.

SUMMARY OF THE INVENTION

It is an object of the present invention to provide a new and improved profile measurement apparatus for continuously and accurately measuring the thickness of a linearly moving sheet-like strip at high speed.

The profile measurement apparatus of the present invention has a plurality of radiation sources and a plurality of radiation detectors which respectively correspond to the radiation sources. A travelling strip such as a rolled steel sheet is sandwiched between the radiation sources and the radiation detectors. The stationary radiation sources are approximately linearly disposed and spaced apart from one surface of the strip by a predetermined distance. The radiation sources simultaneously and continuously produce a plurality of fan-shaped or sector-shaped radiation beams substantially perpendicular to the surface of the strip and to the travelling direction of the strip. The radiation beams are at least partially transmitted within the substantially linear surface region of the travelling strip and are incident on the corresponding multi-channel radiation detectors. Each radiation detector receives the sector-shaped radiation beam which is radiated from the corresponding source and partially transmitted through the strip. The radiation detectors produce profile signals each corresponding to the intensity or amount of the incident radiation beams. These profile signals correspond to the thickness of linear surface regions irradiated by the radiation sources. A microprocessor is connected to the multi-channel detectors. The microprocessor produces at least an image signal indicating the sectional shape of the irradiated linear surface region based on the profile signals. Therefore, all the surface regions of the travelling strip are scanned by a plurality of radiation beams each having a sector section. The entire section of the strip along its width can be constantly measured.

BRIEF DESCRIPTION OF THE DRAWINGS

The present invention is best understood by reference to the accompanying drawings, in which.

DETAILED DECRIPTION OF THE PREFERRED EMBODIMENT

Figure 1:
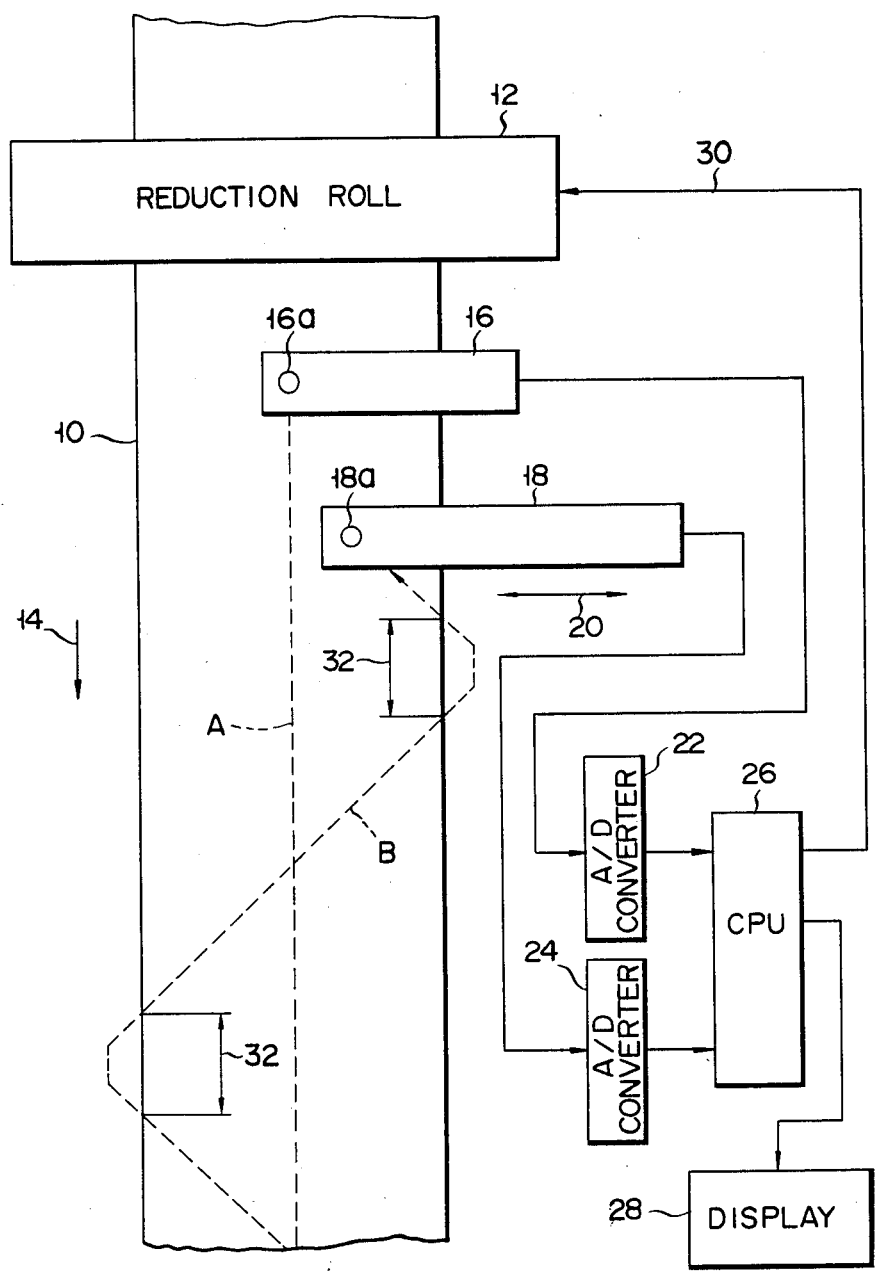
FIG. 1 is a block diagram showing a rolled steel sheet manufacturing system which includes a conventional profile measurement apparatus using radiation.

In order to help full understanding of the present invention, a conventional profile measurement apparatus will be described with reference to FIG. 1. FIG. 1 schematically shows the conventional rolled steel sheet manufacturing system which includes a profile measurement apparatus for measuring by radiation the thickness of a section of a continuously travelling rolled steel sheet.

In the conventional rolled steel sheet manufacturing system shown in FIG. 1, a rolled steel sheet 10 as a strip which is rolled by a reduction roll 12 is conveyed in the direction indicated by an arrow 14. A stationary radiation source 16a continuously emits a radiation beam at the central portion between the two side edges of the travelling rolled steel sheet 10. The radiation source 16a is supported by a stationary profile detector 16 above the rolled steel sheet 10. When the stationary radiation source 16a vertically emits a radiation beam such as X-rays at the central portion between the two side edges of the rolled steel sheet 10, the stationary profile detector 16 serves to constantly detect the thickness of the rolled steel sheet 10 along the central portion (indicated by dotted line A) thereof. A movable profile detector 18 is arranged to reciprocate in the direction indicated by an arrow 20 and is adjacent to the stationary profile detector 16. The movable profile detector 18 has at the distal end portion thereof a radiation source 18a for radiating X-rays onto the rolled steel sheet 10 in a substantially vertical manner. The rolled steel sheet 10 is conveyed in the direction indicated by the arrow 14, and the radiation source 18a disposed at the movable profile detector 18 reciprocates in the direction indicated by the arrow 20, which is substantially perpendicular to the arrow 14, such that an X-ray beam (not shown) scans the rolled steel sheet 10 in a zigzag manner as shown by dotted line B in FIG. 1. Thus, the movable profile detector 18 functions to continuously detect the thickness of a portion of the rolled steel sheet 10 along dotted line B. When the X-ray beam emitted from the movable radiation source 18a falls outside the rolled steel sheet 10, the scan direction of the movable radiation source is reversed along the direction indicated by the arrow 20.

The two types of profile detectors 16 and 18 are respectively connected to analog/digital converters 22 and 24 (to be referred to as A/D converters 22 and 24 hereinafter) whose outputs are connected to a central processing unit 26 (to be referred to as a CPU 26 hereinafter). The analog profile signals produced by the stationary and movable profile detectors 16 and 18 are converted to digital signals by the A/D converters 22 and 24, respectively, and are supplied to the CPU 26. The CPU 26 computes a difference between profile data corresponding to the profile signal which is produced by the stationary profile detector 16 and which is detected at the central portion of the rolled steel sheet 10, and profile data corresponding to the profile signal which is produced by the movable profile detector 18 and which is detected along the zigzag track. The CPU 26 extracts and forms a sectional image of the rolled steel sheet 10 in accordance with the two profile or detection signals and a predetermined algorithm and causes a display such as a cathode-ray tube 28 (to be referred to as a CRT 28 hereinafter) to display the sectional image of the rolled steel sheet 10. The CPU 26 includes an automatic gauge controller (to be referred to as an AGC hereinafter) which feeds back the profile signal from the stationary profile detector 16 to a known gauge controller (not shown) of the reduction roll 12 through a channel 30 and controls the gauge controller.

The following drawbacks are presented by the conventional rolled steel sheet manufacturing system including the conventional profile measurement apparatus (profile meter). Firstly, the continuously manufactured and conveyed rolled steel sheet 10 is scanned in a zigzag form upon reciprocal movement of the movable profile detector 18 and the measured section of the rolled steel plate 10 becomes an oblique section with respect to the longitudinal direction of the rolled steel sheet 10. Even when the sheet thickness deviates undesirably along the direction indicated by the arrow 14 of the linearly travelling rolled steel sheet 10, the deviation cannot be always detected, thus resulting in inaccurate measurement.

Secondly, since the X-ray scan speed is limited due to the response time of the movable profile detector 18, a relatively long scan period of about 1 minute is required to complete measurement of the entire section of the rolled steel plate 10. As a result, a response time from the detection of a variation in the sheet thickness to the start of the gauge correction performed by the AGC of the reduction roll 12 is undesirably prolonged.

Thirdly, even though the stationary and movable profile detectors 16 and 18 are disposed to be adjacent to each other, the measuring points on the rolled steel sheet 10 remain to be spaced apart. In accordance with the presence of a distance between such real measuring points, the CPU 26 must perform a predetermined correction in which correction data must be added to the measured data. As a result, the internal configuration of the CPU 26 becomes complex, and the precision of the profile measurement may often be degraded.

Fourthly, when the X-ray beam from the movable radiation source 18a falls outside the rolled steel sheet 10 upon movement of the movable profile detector 18, the scan direction of the movable radiation source 18a is reversed. However, a time lag (response delay time) before reverse operation produces nondetectable portions 32. Even if a variation in thickness of the rolled steel sheet 10 is present in the nondetectable portion 32, such variation cannot be detected. As a result, the precision of the measuring accuracy is degraded.

Figure 2:
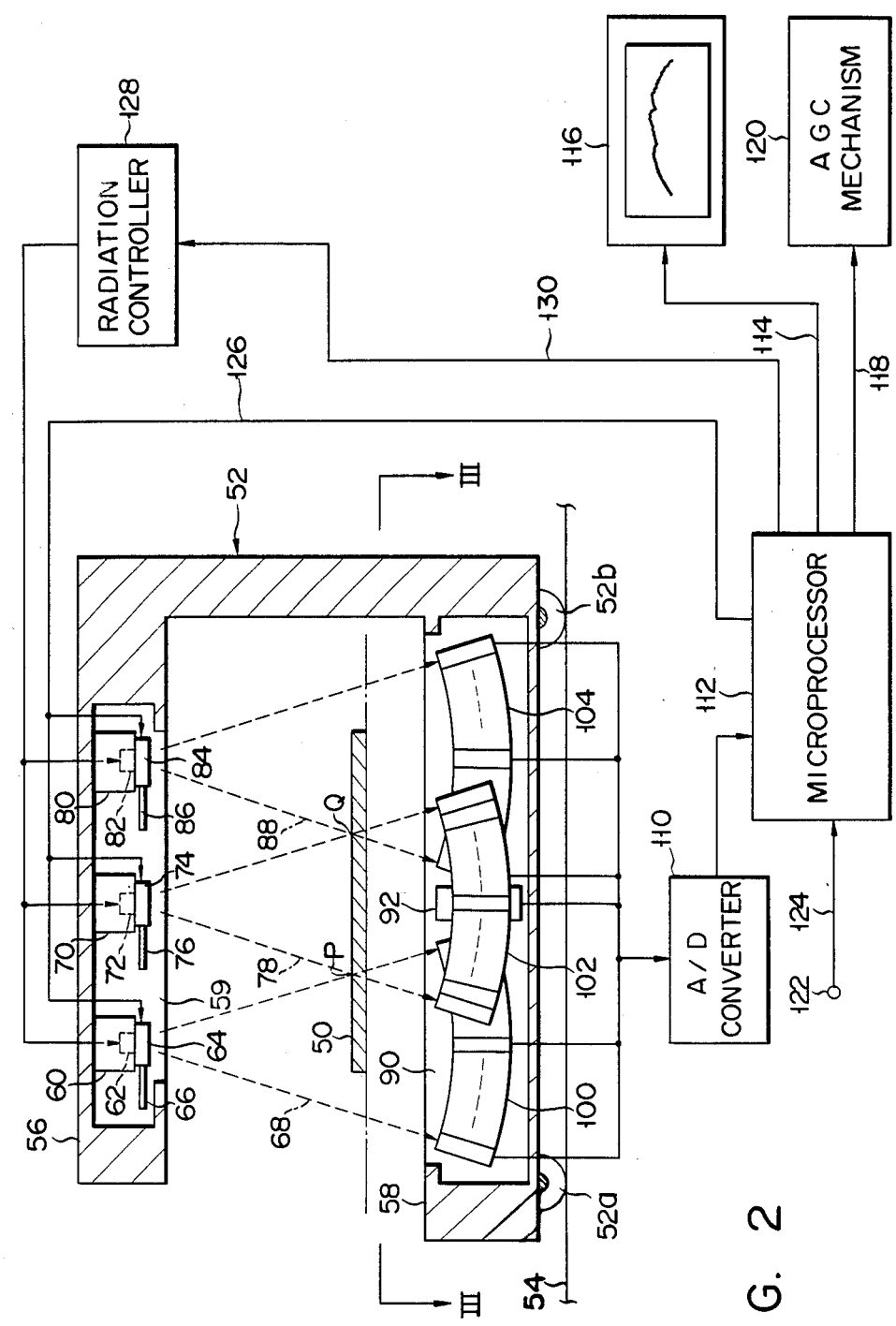
FIG. 2 is a block diagram showing a rolled steel sheet manufacturing system which includes a profile measurement apparatus using radiation according to an embodiment of the present invention.

Referring now to FIG. 2, there is illustrated a rolled steel sheet manufacturing system to which a profile measurement apparatus using radiation is applied according to an embodiment of the present invention. In the above system, the strip to be measured comprises a rolled steel sheet 50 having a section shown in FIG. 2. The rolled steel sheet or strip 50 is manufactured by a reduction roll 51 (FIG. 3) and is conveyed at a high speed of approximately 1,000 m/min in the direction perpendicular to the drawing from its back surface to its front surface. A pedestal or table 52 is disposed to surround the travelling rolled steel sheet 50 to be spaced apart therefrom by a predetermined distance. The table 52 has wheels 52a and 52b slidable along a base 54 in the direction substantially perpendicular to the travelling direction of the rolled steel sheet 50. (The table may be also referred to as a carriage.) The table 52 further has upper and lower supports 56 and 58 which sandwich the rolled steel sheet 50 therebetween. Therefore, the rolled steel sheet 50 is conveyed by a known means such as feed rollers (not shown) at a predetermined positional level between the upper and lower supports 56 and 58.

A recess 59 is formed in a surface of the upper support 56 which opposes the rolled steel sheet 50. A plurality of radiation sources are properly arranged and secured to the recess 59 in accordance with the width of the rolled steel sheet as the strip. In the embodiment shown in FIG. 2, three radiation source vessels 60, 70 and 80 are immobably housed in the recess 59. The radiation source vessels 60, 70 and 80 have stationary radiation sources 62, 72 and 82 respectively for radiating radiation beams such as X-ray beams. The radiation sources 62, 72 and 82 radiate X-ray beams in the form of a fan-shaped curtain or in a sector shape on the upper surface of the travelling rolled steel sheet 50 through openings or windows formed on surfaces of the radiation source vessels 60, 70 and 80 respectively which oppose strip 50. Calibration mechanisms 64, 74 and 84 with slidable reference or calibration plates 66, 76 and 86 for selectively allowing transmission of radiation at desired periods are made of a material having a predetermined transmittance and are mounted at the X-ray irradiation windows (not visible in FIG. 2) of the radiation source vessels 60, 70 and 80, respectively. When the calibration mechanisms 64, 74 and 84 cause the reference or calibration plates 66, 76 and 86 to open, radiation beams such as X-ray beams from the radiation sources 62, 72 and 82 respectively are directly radiated on the rolled steel sheet 50 through the windows. The radiation regions of the radiation beams are determined by the size and shape of the windows of the radiation source vessels 60, 70 and 80, respectively. Radiation regions 68, 78 and 88 of the radiation beams respectively from the radiation sources 62, 72 and 82 are determined as shown in FIG. 2. More particularly, the radiation source 72 located at the center of the three radiation sources radiates the beam to cover substantially the central portion between the two side edges of the strip-like rolled steel sheet 50. Therefore, the radiation beam from the radiation source 72 is so determined that the radiation region 78 formed thereby crosses at the substantially central portion (region defined between points P and Q) of the rolled steel sheet 50. In this condition, one of the boundaries of the radiation region 68 formed by the radiation source 62 which is located at one end of the radiation array crosses the rolled steel sheet 50 at point P. Similarly, one of the boundaries of the radiation region 88 formed by the radiation source 82 which is located at the other end of the radiation array crosses the rolled steel sheet 50 at point Q. The level of the travelling rolled steel sheet 50, the mounted levels of the windows of the radiation source vessels 60, 70 and 80, and/or the mounted levels of the radiation sources 62, 72 and 82 are properly determined to radiate the beams on the rolled steel sheet 50 in the manner described above.

Figure 2A:
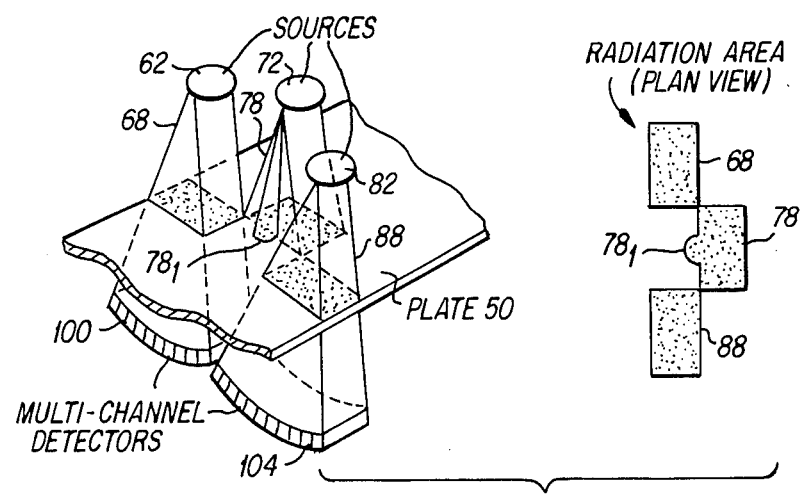
FIG. 2A is a perspective view of the structure shown in FIG. 2, including an illustration of the radiation patterns emitted by the radiation sources, and a plan view of the radiation impingement on the rolled steel sheet.

A recess 90 is formed in the upper surface of the lower support 58 of the table 52, the upper surface opposing the rear surface of the rolled steel sheet 50. A mono-channel radiation meter or detector 92 (to be referred to as a mono-channel detector 92 hereinafter) is disposed in the recess 90 immediately below the central portion of the rolled steel sheet 50 and detects radiation from a selected of the radiation sources, such as the source 72. Furthermore, three multi-channel radiation meters or detectors 100, 102 and 104 (to be referred to as multi-channel detectors 100, 102 and 104 hereinafter) are disposed in the recess 90 of the lower support 58 and correspond to, i.e., receive radiation from, the radiation source vessels 60, 70 and 80, respectively. Each of the multi-channel detectors 100, 102 and 104 comprises an array of detector components which are arranged in a sector or arc shape in the direction of the width of the rolled steel sheet 50 to receive the sector-shaped beams from the radiation sources 62, 72 and 82, respectively. The mono-channel detector 92 has an area greater than each of the detector components of the multi-channel detectors 100, 102 and 104. FIG. 2A is a perspective view of the structure shown in FIG. 2, and includes a plan view of the radiation pattern produced by sources 62, 72 and 82. FIG. 2A more clearly shows that the pattern 78 from source 72 includes a small projection 78, for irradiating the mono-channel detector 92.

Figure 3:
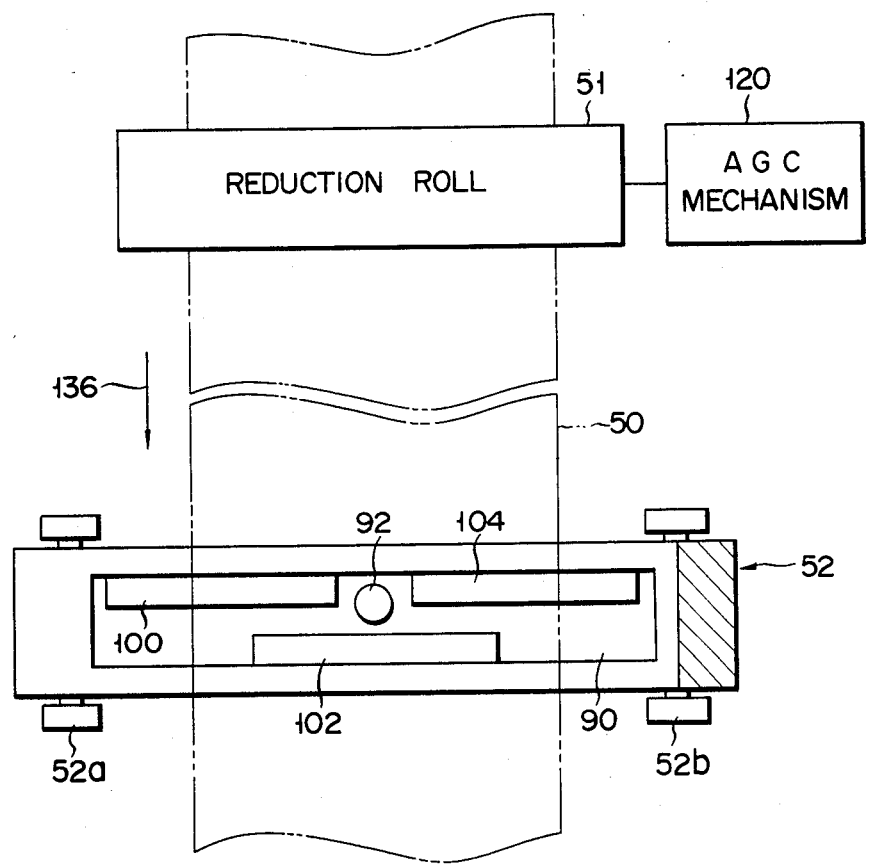
FIG. 3 is a sectional view of the profile measurement apparatus using radiation taken along the line III—III in FIG. 2, especially illustrating the arrangement of a mono-channel detector and multi-channel detectors with reference to the rolled steel sheet taken off from the reduction roll.

FIG. 3 schematically illustrates the arrangement of the detectors 92, 100, 102 and 104 in the lower support 58. The multi-channel detectors 100 and 104 substantially sandwich the mono-channel detector 92 and are aligned on a line. The multi-channel detector 102 is secured in the recess 90 of the lower support 58 such that the multi-channel detector 102 is parallel to the multi-channel detectors 100 and 104 and is adjacent thereto.

Referring to FIG. 2 again, the multi-channel detectors 100, 102 and 104, and the mono-channel detector 92 are connected to an A/D converter 110. The A/D converter 110 converts analog profile signals from the detectors 92, 100, 102 and 104 to digital profile signals. The A/D converter 110 has an output end connected to a microprocessor 112 including a CPU (not shown). The microprocessor 112 receives the digital signals from the A/D converter 110 corresponding to the radiation detection signals. The microprocessor 112 then computes the sectional shape of the rolled steel sheet 50 and produces a pattern signal 114 representing it. The pattern signal 114 is supplied to a display such as a CRT 116. The microprocessor 112 also receives the digital signal from the A/D converter 110 corresponding to the radiation detection signal from the mono-channel detector 92. The microprocessor 112 computes a thickness of the rolled steel sheet for the reduction roll 51 in accordance with the digital signal corresponding to the radiation detection signal from the mono-channel detector 92 and then supplies an AGC signal 118 to a known AGC mechanism 120 of the reduction roll 51. The rolling operation of the reduction roll 51 controlled by the AGC mechanism 120 in response to the AGC signal 118 is known to those who are skilled in the art, and a detailed description thereof will be omitted.

In response to a radiation calibration signal 124 supplied in a known manner, the microprocessor 112 produces a calibration mechanism control signal 126 to control the opening/closing of the calibration plates 66, 76 and 86 of the calibration mechanisms 64, 74 and 84 of the radiation source vessels 60, 70 and 80 disposed at the upper support 56. The microprocessor 112 also serves to supply a control signal 130 to a control section 128 for controlling the amount of radiation emitted from the radiation sources 62, 72 and 82.

The mode of operation of the rolled steel sheet manufacturing system having the profile measurement apparatus according to an embodiment of the present invention will now be described. At the time of calibration before profile measurement, the reference or calibration plates 66, 76 and 86 are closed with the rolled steel sheet 50 not being present between the upper and lower supports 56 and 58. The windows of the radiation source vessels 60, 70 and 80 are closed by the calibration plates 66, 76 and 86, respectively. The radiation beams radiated from the radiation sources 62, 72 and 82 and passing through the reference or calibration plates 66, 76 and 86 are incident on the mono-channel detector 92 and the multi-channel detectors 100, 102 and 104. The outputs from the detectors 92, 100, 102 and 104 are converted to digital signals by the A/D converter 110, and are supplied to the microcomputer 112. The microprocessor 112 then calibrates the profile measurement apparatus in accordance with a predetermined calibration algorithm. (This radiation calibration technique is disclosed in U.S. Pat. No. 3,955,086 to Tsujii et al.).

When the above calibration is completed, the calibration plates 66, 76 and 86 are fully opened under the control of the microprocessor 112 in order to start thickness measurement of the rolled steel plate 50. At this time, the sector-shaped radiation beams are directly radiated from the radiation sources 62, 72 and 82 onto the travelling rolled steel sheet 50 through vessel openings without being blocked by the calibration plates 66, 76 and 86. The radiation beams do not cross each other. The radiation beams pass through the rolled steel sheet 50 and are incident on the detectors 92, 100, 102 and 104. The radiation profile signals from the detectors 92, 100, 102 and 104 are supplied as digital profile signals to the microprocessor 112 through the A/D converter 110. The microprocessor 112 computes a profile signal from the mono-channel detector 92 which detects radiation beams passing through the substantially central portion of the rolled steel sheet 50 in accordance with a predetermined algorithm. The computed result is supplied as the AGC signal 118 to the AGC mechanism 120 of the reduction roll 51. The reduction roll 51 is controlled in response to the AGC signal 118 such that the thickness of the rolled steel sheet 50 corresponds to a predetermined suitable thickness. The profile signals from the multi-channel detectors 100, 102 and 104 are used to allow the microprocessor 112 to perform predetermined operations for sectional image extraction of the rolled steel sheet 50. Based on the section pattern signal 114 from the microprocessor 112, the display device 116 visually displays a sectional image of the rolled steel sheet 50 whose thickness is measured.

According to the profile measurement apparatus of the above embodiment, the sectional shape can be monitored throughout the entire width of the rolled steel sheet 50 by the multi-channel detectors 100, 102 and 104 disposed in the direction perpendicular to the convey direction of the rolled steel sheet 50. Three radiation beams respectively having sector shapes are constantly radiated on the rolled steel sheet 50 and do not overlap each other at the section of the rolled steel sheet 50. These radiation beams are respectively incident on the multi-channel detectors 100, 102 and 104. Therefore, the sectional image of the rolled steel sheet which is monitored at the display device 116 becomes the accurate sectional image of the rolled steel sheet 50 without requiring complex operation of the microprocessor 112. It should be noted that the multi-channel detector 102 is parallel to the multi-channel detectors 100 and 104 which are aligned on the same line perpendicular to a conveying direction 14 of the rolled steel sheet 50, and is spaced apart therefrom by a small distance. The rolled steel sheet 50 is conveyed at a high speed of 1,000 m/min and it takes about 0.1 sec for the multi-channel detectors 100, 102 and 104 to measure the sectional shape. However, in practice, the small distance described above between the multi-channel detector 102 and the multi-channel detectors 100 and 104 does not adversely affect the measuring precision.

Unlike the prior art, in the above embodiment of the present invention, the radiation sources need not be mechanically moved to monitor the sectional shape of the rolled steel sheet 50. Therefore, the effective measurement of the strip shape along the entire width of the rolled steel sheet 50 can be performed within a short period of time, thus increasing the measuring speed. Unlike the prior art shown in FIG. 1, the nondetectable portion may not occur. Furthermore, noise due to the mechanical movement may not appear on the screen.

Since the mono-channel detector 92 is disposed independent of the multi-channel detectors 100, 102 and 104 at the center between the two edges of the travelling rolled steel sheet 50, the mono-channel detector 92 constantly measures the thickness at the center portion between the two side edges of the rolled steel sheet 50 independent of the measuring operation by the multi-channel detectors 100 102 and 104. Thus, the AGC signal which is required for feedback control for making the sheet thickness uniform can be very precisely obtained at high speed. As a result, the reduction roll 51 can be very precisely controlled at high speed so as to roll the material to a predetermined thickness. Further, since the mono-channel detector 92 is incorporated to detect the thickness of the rolled steel sheet 50 only, the mono-channel detector 92 has a detectable area greater than a detectable area (which is narrower along the width of the rolled steel sheet in order to improve the resolution of the sectional image) of each of the detector components of the profile measuring multi-channel detectors 100, 102 and 104. Therefore, the radiation beams (X-ray beams) passing through a relatively large area of the rolled steel sheet 50 can be detected, thus providing a more accurate measuring value of the sheet thickness. The profile measurement apparatus according to the present invention is most suitable for a reduction roll of the type in which a gap between the rollers is adjusted to manufacture the rolled steel sheet having a uniform thickness.

Although the present invention has been shown and described with respect to a particular embodiment, nevertheless, various changes and modifications which are obvious to a person skilled in the art to which the invention pertains are deemed to lie within the spirit, scope and contemplation of the invention.

The table 52 may comprise a moving mechanism for automatically aligning the central portion between the two edges of the rolled steel sheet 50 with the position of the mono-channel detector 92. The strip is not limited to the rolled steel sheet 50, but can be extended to materials such as an aluminum plate or a glass plate which can be rolled and measured using radiation.

What is claimed is:

1. A profile measurement apparatus for measuring a thickness of a strip which is conveyed in a predetermined direction, comprising:
   (a) a plurality of stationary radiation sources disposed in an approximately linear manner and spaced apart from one surface of said strip, for simultaneously and continuously producing a plurality of radiation beams of sector shapes in a direction substantially perpendicular to a travelling direction of the strip along the width of the strip, at least two of the radiation bemas being offset with respect to each other in the travelling direction, and the radiation beams in combination being simultaneously and continuously incident along a substantially linear surface area along the entire width of said one surface of said strip and at least partially transmitted through said strip;
   (b) a plurality of multi-channel detectors disposed to be spaced apart from the other surface of said strip and respectively corresponding to said plurality of radiation sources, for respectively and independently receiving the radiation beams of sector shapes which are continuously radiated from said radiation sources and which are transmitted through said strip to become incident on the corresponding one of the multi-channel detectors, and for producing first profile signals corresponding to intensities of said incident radiation beams and to thickness at the substantially linear surface area radiated by the radiation beams; and
   (c) operating means, connected to said multi-channel detectors, for producing an image signal indicating a sectional shape at the substantially linear surface area of said strip in accordance with the first profile signals, whereby the entire surface of said strip is scanned with the sector-shaped radiation beams and hence a section of said strip along the entire width thereof is continuously measured.

2. An apparatus according to claim 1, wherein said plurality of radiation sources respectively radiate the sector-shaped radiation beams toward the travelling strip so as to cause said radiation beams to respectively pass substantially different sectional portions of said strip in order to prevent said radiation beams from overlapping each other at the boundaries thereof in a given sectional region of the travelling strip.

3. An apparatus according to claim 2, further comprising a mono-channel radiation detector disposed to be spaced apart from the other surface of said strip and to be adjacent to said plurality of mult-channel detectors, for receiving a part of at least a selected one of the radiation beams transmitted through the strip and for producing a second profile signal corresponding to an intensity of said part of the radiation beam and to a partial thickness of said strip.

4. An apparatus according to claim 3, wherein said mono-channel radiation detector is disposed to correspond to a central portion between two edges of said strip, whereby the thickness at the central portion between the two side edges of said strip is continuously measured.

5. An apparatus according to claim 4, wherein each of said plurality of multi-channel detectors comprises a plurality of detector components which are aligned in an arc form so as to continuously receive the radiation beam from each of said plurality of radiation sources, and wherein said mono-channel detector has a radiation detectable area greater than a radiation detectable area of each of said detector components of each of said plurality of multi-channel detectors.

6. An apparatus according to claim 3, further comprising displaying means, connected to said operating means, for receiving the image signal and visually and continuously displaying over time a shape of the section of said strip along the entire width thereof, the shape being represented by the image signal.

7. An apparatus according to claim 6, wherein said radiation sources comprise:

vessel means for respectively enclosing said plurality of radiation sources and for respectively having surfaces with openings opposing said one surface of said strip;

plate means respectively disposed to be adjacent to said surfaces of said vessel means, slidable to open/close said openings and comprising a material having a predetermined radiation transmittance; and plate driving means for driving said plate means to close said openings of said vessel means before profile measurement is performed and for driving said plate means to open said openings when the profile measurement is performed.

8. An apparatus according to claim 7, wherein a table means is disposed to be movable in a direction of said strip, for supporting in a stationary manner at least said plurality of radiation sources, said vessel means, said plurality of multi-channel detectors, and said mono-channel detector.

9. An apparatus according to claim 8, wherein said plurality of radiation sources include three radiation sources for radiating X-ray beams, and said plurality of multi-channel detectors includes three multi-channel radiation detectors being supported by said table means in correspondence with each other.

10. An apparatus according to claim 7, wherein said operating means receives the second profile signal from said mono-channel detector, computes a thickness at the central portion between the side edges of said strip which is indicated by the second profile signal, and generates an electrical signal as an automatic gauge control signal which corresponds to a difference between a predetermined reference value and the thickness at the central portion.

* * * * *